(12) United States Patent
Kataoka et al.

(10) Patent No.: US 10,566,019 B2
(45) Date of Patent: Feb. 18, 2020

(54) MAGNETIC RECORDING MEDIUM

(71) Applicants: FUJI ELECTRIC CO., LTD., Kawasaki-shi (JP); TOHOKU UNIVERSITY, Sendai-shi (JP)

(72) Inventors: Hiroyasu Kataoka, Matsumoto (JP); Hiroto Kikuchi, Matsumoto (JP); Akira Furuta, Matsumoto (JP); Hitoshi Nakata, Matsumoto (JP); Tomohiro Moriya, Matsumoto (JP); Takehito Shimatsu, Sendai (JP)

(73) Assignee: Fuji Electric Co., Ltd., Kanagawa (JP)

( * ) Notice: Subject to any disclaimer, the term of this patent is extended or adjusted under 35 U.S.C. 154(b) by 302 days.

(21) Appl. No.: 15/611,503

(22) Filed: Jun. 1, 2017

(65) Prior Publication Data
US 2017/0270955 A1     Sep. 21, 2017

Related U.S. Application Data

(63) Continuation of application No. PCT/JP2016/002221, filed on Apr. 27, 2016.

(30) Foreign Application Priority Data

Jun. 18, 2015  (JP) .................................. 2015-123043
Jan. 8, 2016   (JP) .................................. 2016-003028

(51) Int. Cl.
  *G11B 5/66*  (2006.01)
  *G11B 5/73*  (2006.01)
  *G11B 5/65*  (2006.01)

(52) U.S. Cl.
  CPC .............. *G11B 5/7379* (2019.05); *G11B 5/65* (2013.01)

(58) Field of Classification Search
  CPC ........ G11B 5/732; G11B 5/7325; G11B 5/738; G11B 2005/0021; G11B 5/7379
  See application file for complete search history.

(56) References Cited

U.S. PATENT DOCUMENTS 9,601,144 B1 * 3/2017 Mehta ..................... G11B 5/66
9,601,145 B1 * 3/2017 Grobis .................... G11B 5/66
(Continued)

FOREIGN PATENT DOCUMENTS

JP   H02-071424 A   3/1990
JP   2003-036514 A  2/2003
(Continued)

OTHER PUBLICATIONS

English machine translation JP 2015-41392, 2015, pp. 1-16.*
(Continued)

*Primary Examiner* — Holly C Rickman
(74) *Attorney, Agent, or Firm* — Venable LLP; Henry J. Daley

(57) ABSTRACT

The purpose of the present invention is to provide a magnetic recording medium capable of reducing the surface roughness of the magnetic recording layer without adversely affecting the magnetic properties of the magnetic recording layer. The magnetic recording medium of the present invention includes a substrate, a seed layer on the substrate, and a magnetic recording layer on the seed layer, wherein the seed layer has a structure of: (a) a spinel structure consisting of Mg, Cr and O; (b) a spinel structure consisting of Zn, Fe and O; or (c) an inverse spinel structure consisting of Mg, Ti and O.

7 Claims, 15 Drawing Sheets

(56) References Cited

U.S. PATENT DOCUMENTS

| | | | |
|---|---|---|---|
| 2012/0307398 A1 | 12/2012 | Kanbe et al. | |
| 2013/0040167 A1 | 2/2013 | Alagarsamy et al. | |
| 2017/0047090 A1* | 2/2017 | Moriya | G11B 5/65 |
| 2018/0286445 A1* | 10/2018 | Moriya | G11B 5/73 |

FOREIGN PATENT DOCUMENTS

| | | |
|---|---|---|
| JP | 2009-252308 A | 10/2009 |
| JP | 2010-118147 A | 5/2010 |
| JP | 2011-146089 A | 7/2011 |
| JP | 2011-165232 A | 8/2011 |
| JP | 2014-034635 A | 2/2014 |
| JP | 2014-056622 A | 3/2014 |
| JP | 2015-041392 A | 3/2015 |

OTHER PUBLICATIONS

Penoyer, R.F., "Automatic Torque Balance for Magnetic Anisotropy Measurements", The Review of Scientific Instruments, Aug. 1959, vol. 30, No. 8, pp. 711-714.
Chikazumi, Soshin, "Physics of Ferromagnetism vol. II", Shokabo Co., Ltd., pp. 10-21.
International Search Report in counterpart International Application No. PCT/JP2016/002221, dated Jul. 5, 2016.

\* cited by examiner (a)

Ra = 0.359 nm (b)

Ra = 0.395 nm (c)

Ra = 0.501 nm

MAGNETIC RECORDING MEDIUM

CROSS-REFERENCE TO THE RELATED APPLICATION

This application is a continuation application of PCT Application No. PCT/JP2016/002221 filed on Apr. 27, 2016 under 37 Code of Federal Regulation § 1.53 (b) and the PCT application claims the benefit of Japanese Patent Application No. 2015-123043 filed on Jun. 18, 2015 and Japanese Patent Application No. 2016-003028 filed on Jan. 8, 2016, all of the above applications being hereby incorporated by reference wherein in their entirety.

BACKGROUND OF THE INVENTION

Field of the Invention

The present invention relates to a magnetic recording medium. In particular, the present invention relates to a magnetic recording medium used in a hard disc magnetic recording device (HDD).

Description of the Related Art

Perpendicular magnetic recording system is adopted as a technique for achieving high-density magnetic recording. A perpendicular magnetic recording medium at least comprises a non-magnetic substrate and a magnetic recording layer formed of a hard-magnetic material. Optionally, the perpendicular magnetic recording medium may further comprise: a soft-magnetic under layer which is formed from soft-magnetic material and plays a role in concentrating the magnetic flux generated by a magnetic head onto the magnetic recording layer; an interlayer for orienting the hard-magnetic material in the magnetic recording layer in an intended direction; a protective film for protecting the surface of the magnetic recording layer; and the like.

The magnetic recording layer of the perpendicular magnetic recording medium formed of a granular magnetic material has been proposed, for the purpose of obtaining favorite magnetic properties. The granular magnetic material comprises magnetic crystal grains and a non-magnetic body segregated to surround the magnetic crystal grains. Respective magnetic crystal grains in the granular magnetic material are magnetically separated from each other with the non-magnetic body.

For the purpose of further increasing the recording density of the perpendicular magnetic recording medium, a need for reduction in the grain diameter of the magnetic crystal grains in the magnetic layer arises in recent years. On the other hand, the reduction in the grain diameter of the magnetic crystal grains leads to a decrease in thermal stability of the recorded magnetization (signals). Thus, the magnetic crystal grains in the magnetic layer need to be formed of a material with higher magnetocrystalline anisotropy, in order to compensate the decrease in thermal stability due to the reduction in the grain diameter of the magnetic crystal grains. As the material having the required higher magnetocrystalline anisotropy, $L1_0$ ordered alloys have been proposed. Typical $L1_0$ ordered alloys include FePt, CoPt, FePd, CoPd, and the like.

It has been tried to improve the magnetic properties of the magnetic recording layer comprising the $L1_0$ ordered alloy by stacking a layer of the $L1_0$ ordered alloy and a non-magnetic metallic layer. For example, Japanese Patent Laid-Open No. 2003-036514 proposes a magnetic recording medium capable to achieve easy compositional control and excellent magnetic properties by forming a magnetic recording layer, in which FePt layers and Ag layers are alternately stacked, onto a substrate consisting of spinel or the like. This proposal describes that physical separation of the FePt magnetic crystal grains can be readily achieved by using Ag having a lattice parameters comparable with those of FePt and exhibiting low solubility in Fe and Pt. Further, this proposal discloses usefulness of the spinel as the substrate, parallelly to MgO. However, it is not corroborated whether the above-described effect is obtainable in the case where the spinel is used.

It has been tried to improve the magnetic properties of the magnetic recording layer comprising the $L1_0$ ordered alloy by a layer formed under the magnetic recording layer. For example, Japanese Patent Laid-Open No. 2011-165232 proposes a magnetic recording medium in which the magnetic recording layer is formed on an interlayer comprising MgO as a principal component and one or more of additional oxides. In this proposal, facilitation of separation of the magnetic crystal grains, reduction of exchange coupling, and reduction of dispersion in coercive force are allowed by reducing the crystal grain diameter in the interlayer by addition of the additional oxides, and forming one magnetic crystal grain in the magnetic recording layer onto one crystal grain in the interlayer (hereinafter, referred to as "one-to-one formation").

Besides, Japanese Patent Laid-Open No. 2011-146089 proposes a magnetic recording medium in which a seed layer consisting of amorphous ceramics such as $SiO_2$, an orientation controlling layer consisting of a crystalline material such as MgO and $MgAl_2O_4$, and a magnetic layer comprising FePt alloy as a principal component are stacked in this order. In this proposal, improvement in the crystalline orientation and miniaturization of the structure of the orientation controlling layer are allowed by disposing the seed layer consisting of the amorphous ceramics. Then, the magnetic layer having a large magnetic anisotropy constant Ku, excellent magnetic properties and excellent read/write characteristics can be obtained by suppressing disturbance in crystalline orientation of the FePt alloy in the magnetic layer and reducing the grain diameter of the magnetic crystal grains.

Further, it has been tried to improve the magnetic recording characteristics of a magnetic recording layer consisting of cobalt ferrite represented by a formula of $Co_xFe_{3-x}O_4$ (x is less than 3) by a layer formed under the magnetic recording layer. For example, Japanese Patent Laid-Open No. 2015-041392 proposes a magnetic recording medium in which a seed layer consisting of a spinel type oxide is formed between an interlayer consisting of MgO and a magnetic recording layer of the cobalt ferrite. This proposal discloses $Mg_{1+y}Ti_{2-y}O_4$ (y is less than 1) as an example of the spinel type oxide. This proposal alleviates lattice mismatch between the MgO interlayer and the cobalt ferrite magnetic recording layer by the seed layer consisting of the oxide having the spinel structure which is analogous to the cobalt ferrite. However, this proposal does not teach or suggest in any way whether or not the seed layer consisting of the spinel type oxide is effective to magnetic recording layers consisting of a material other than the cobalt ferrite.

One of the factors which should be considered when intending improvement in the recording density of the magnetic recording layer is a distance between the magnetic recording layer and a magnetic head. In general, the recording density can increase, as the distance between the magnetic recording layer and a magnetic head decreases. On the other hand, the distance between the magnetic recording layer and a magnetic head must be larger than the surface roughness of the magnetic recording medium. Increase of the surface roughness of the magnetic recording medium leads to adverse influence to the flying characteristics of the magnetic head, so that the read/write characteristics of the magnetic recording medium may deteriorate. In the case of the interlayer consisting of conventionally used MgO, it is necessary to raise the substrate temperature during formation of the interlayer to not less than 400° C. for achieving the desired surface roughness. Therefore, there is a need for reducing the surface roughness of the magnetic recording medium, especially the surface roughness of the magnetic recording layer.

SUMMARY OF THE INVENTION

One of constitutional examples of the present invention has a purpose of providing a magnetic recording medium capable of reducing the surface roughness of a magnetic recording layer, while exhibiting improved magnetic characteristics.

The magnetic recording medium according to one of constitutional examples of the present invention comprises a substrate, a seed layer on the substrate, and a magnetic recording layer on the seed layer, wherein the seed layer has a structure selected from the group consisting of: (a) a spinel structure consisting of Mg, Cr and O; (b) a spinel structure consisting of Zn, Fe and O; and (c) an inverse spinel structure consisting of Mg, Ti and O. Further, the magnetic recording layer may comprise an ordered alloy. Alternatively, the magnetic recording layer may have a granular structure comprising magnetic crystal grain, and a non-magnetic crystal grain boundary surrounding the magnetic crystal grains. Here, the magnetic crystal grains may comprise an ordered alloy, and the non-magnetic crystal grain boundary may comprise a non-magnetic material selected from the group consisting of carbon, an oxide and a nitride.

By adopting the above-described constitution, it is possible to obtain a magnetic recording medium comprising a seed layer having a small surface roughness, and a magnetic recording layer having a small surface roughness. The resultant magnetic recording medium contributes to excellent flying properties of a magnetic head, to make it possible to increase a magnetic recording density.

Further features of the present invention will become apparent from the following description of exemplary embodiments with reference to the attached drawings.

DESCRIPTION OF THE EMBODIMENTS

Figure 1:
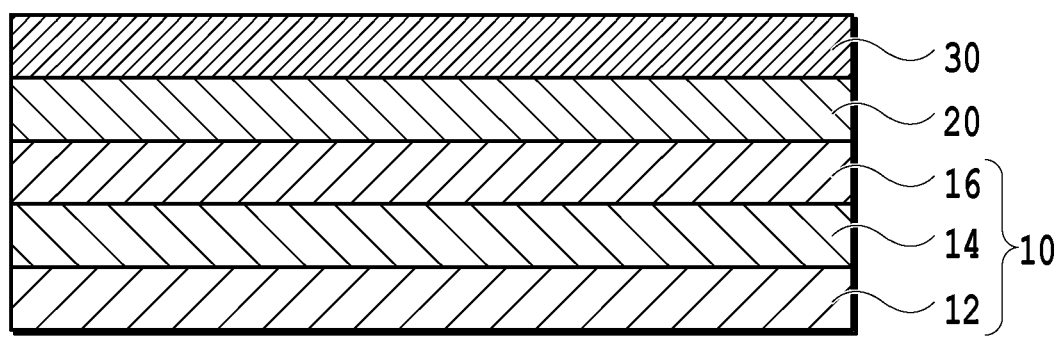
FIG. 1 is a schematic cross-sectional view showing one of constitutional examples of the magnetic recording medium.

A magnetic recording medium according to one embodiment of the present invention comprises a substrate, a seed layer on the substrate, and a magnetic recording layer on the seed layer, wherein the seed layer has a structure selected from the group consisting of: (a) a spinel structure consisting of Mg, Cr and O; (b) a spinel structure consisting of Zn, Fe and O; and (c) an inverse spinel structure consisting of Mg, Ti and O. FIG. 1 shows a constitutional example of the magnetic recording medium of this embodiment. The magnetic recording medium shown in FIG. 1 has a structure in which substrate 10 consisting of non-magnetic support 12, adhesive layer 14 and interlayer 16, seed layer 20, and magnetic recording layer 30 are stacked in this order.

The substrate 10 of this embodiment comprises the non-magnetic support 12. The substrate 10 may further comprise layers known in the art such as the adhesive layer 14, a soft-magnetic under layer, a heat sink layer, and the interlayer 16, on the surface of the non-magnetic support 12 over which the seed layer 20 is formed.

The non-magnetic support 12 may be various substrates having a flat surface. For example, the non-magnetic support 12 may be formed of a material commonly used in magnetic recording media. The useful material comprises a NiP-plated Al alloy, monocrystalline MgO, $MgAl_2O_4$, $SrTiO_3$, tempered glass, crystallized glass, and the like.

The adhesive layer 14, which may be formed optionally, is used for enhancing the adhesion between the layer formed on it and the layer formed under it. The layer formed under the adhesive layer 14 includes the non-magnetic support 12. The material for forming the adhesive layer 14 comprises a metal such as Ni, W, Ta, Cr or Ru, or an alloy containing the above-described metals. The adhesive layer 14 may be a single layer or have a stacked structure with plural layers. The adhesive layer 14 can be formed by any process known in the art, such as a sputtering method or a vacuum deposition method. As used herein, the term "sputtering method" encompasses any technique known in the art such as a DC magnetron sputtering method, and an RF magnetron sputtering method.

The soft-magnetic under layer (not shown), which may be formed optionally, controls the magnetic flux emitted from a magnetic head to improve the read-write characteristics of the magnetic recording medium. The material for forming the soft-magnetic under layer includes: a crystalline material such as a NiFe alloy, a sendust (FeSiAl) alloy, or a CoFe alloy; a microcrystalline material such as FeTaC, CoFeNi or CoNiP; and an amorphous material including a Co alloy such as CoZrNb or CoTaZr. The optimum thickness of the soft-magnetic under layer depends on the structure and characteristics of the magnetic head used in magnetic recording. When forming the soft-magnetic under layer continuously with other layers, the soft-magnetic under layer preferably has a thickness in a range from 10 nm to 500 nm (both inclusive), in view of productivity. The soft-magnetic under layer can be formed by any process known in the art, such as a sputtering method or a vacuum deposition method.

A heat sink layer (not shown) may be provided when the magnetic recording medium of this embodiment is used in a heat-assisted magnetic recording system. The heat sink layer is a layer for effectively absorbing excess heat of the magnetic recording layer 30 that is generated during heat-assisted magnetic recording. The heat sink layer can be formed of a material having a high thermal conductivity and a high specific heat capacity. Such material includes a Cu simple substance, an Ag simple substance, an Au simple substance, or an alloy material composed mainly of these substances. As used herein, the expression "composed mainly of" means that the content of the concerned material is 50% by weight or more. In consideration of its strength or the like, the heat sink layer can be formed of an Al—Si alloy, a Cu—B alloy, or the like. The function of the soft-magnetic under layer, that is, the function of concentrating a perpendicular magnetic field generated by the head to the magnetic recording layer 30, can be imparted to the heat sink layer by forming the heat sink layer of a sendust (FeSiAl) alloy, a soft-magnetic CoFe alloy, or the like. The optimum thickness of the heat sink layer depends on the amount and distribution of heat generated during heat-assisted magnetic recording, as well as the layer configuration of the magnetic recording medium and the thickness of each constituent layer. When forming the heat sink layer continuously with other constituent layers, the heat sink layer preferably has a thickness of 10 nm or more and 100 nm or less, in view of productivity. The heat sink layer can be formed by any process known in the art, such as a sputtering method or a vacuum deposition method. In general cases, the heat sink layer is formed by the sputtering method. The heat sink layer can be formed just under the adhesive layer 14, just under the soft-magnetic under layer, or just under the seed layer 20, or the like, in consideration of properties required for the magnetic recording medium.

The interlayer 16, which may be formed optionally, is a layer for blocking influence of the crystalline structure of the underlying layer on crystalline orientation, a size of magnetic crystal grains and the like of the magnetic recording layer. Further, if the soft-magnetic under layer is disposed, it is required that the interlayer 16 is non-magnetic in order to suppressing magnetic influence on the soft-magnetic under layer. The material for forming the interlayer 16 includes a metal such as Cr and Ta, an Ni—W alloy, and a Cr-based alloy such as CrTi, CrZr, CrTa, and CrW. The interlayer 16 can be formed by any process known in the art, such as a sputtering method.

The seed layer 20 of this embodiment has a structure selected from the group consisting of: (a) a spinel structure consisting of Mg, Cr and O; (b) a spinel structure consisting of Zn, Fe and O; and (c) an inverse spinel structure consisting of Mg, Ti and O. The feature "having a spinel structure can be identified by X-ray diffraction peaks characteristic of the spinel structure. This is also the case for the feature "having an inverse spinel structure".

Further, the seed layer 20 has a thickness of 5 nm or more and 20 nm or less, preferably 10 nm or more and 20 nm or less. By having the thickness within this range, it becomes possible to obtain the spinel or inverse spinel structure having excellent crystallinity, excellent orientation, and small surface roughness. In view of productivity, the seed layer 20 preferably has a thickness of not greater than 20 nm. Then, it becomes possible to reduce the surface roughness of the magnetic recording layer 30 by reducing the surface roughness of the seed layer 20. The reduction in the surface roughness of the magnetic recording layer 30 contributes to reduction of the flying height of a magnetic head, and, thereby, improvement in the magnetic recording density. Further, if the magnetic recording layer comprises an ordered alloy, ordering of the ordered alloy is achieved sufficiently to make it possible to obtain the magnetic recording layer 30 having a large magnetic anisotropy constant Ku, large saturated magnetization Ms, and a large squareness ratio Mr/Ms.

Figure 2:
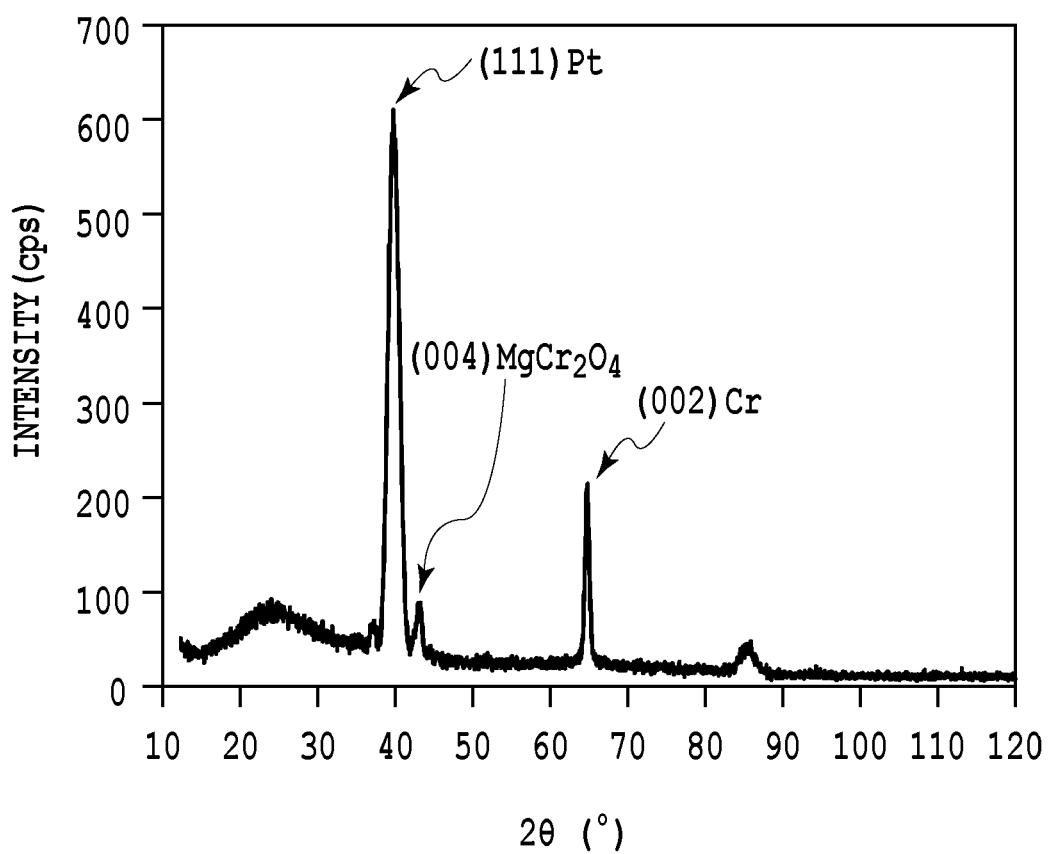
FIG. 2 is a view showing an X-ray diffraction spectrum of $MgCr_2O_4$ having a spinel structure.

The spinel structure (a) useful in this embodiment consists of Mg, Cr and O. The seed layer 20 may be constituted from $Mg(Mg_xCr_{1-x})_2O_{4(1-x)}$ ($0 \leq x \leq 0.25$) having a spinel structure. In other words, the Mg:Cr ratio in the compound $Mg(Mg_xCr_{1-x})_2O_{4(1-x)}$ is in a range from 1:1 ($x=0.25$) to 1:2 ($x=0$). By having the value of x within the above-described range, the compound $Mg(Mg_xCr_{1-x})_2O_{4(1-x)}$ has the spinel structure. As shown in FIG. 2, it is determined that a sample comprising $Mg(Mg_xCr_{1-x})_2O_{4(1-x)}$ has a spinel structure, if a curve indicating a diffraction peak lies on the position of the diffraction peak ($2\theta=43.406°$) of (004) face of $MgCr_2O_4$ having a spinel structure. By the way, the X-ray diffraction spectrum shown in FIG. 2 has been obtained from a sample having a Pt film disposed on its top surface.

Then, it is confirmed that $M_g(Mg_xCr_{1-x})_2O_{4(1-x)}$ ($0 \leq x \leq 0.25$) has a spinel structure due to coincidence of the X-ray diffraction peak. A Cu Kα ray ($\lambda=0.1548$ nm) is used for the X-ray diffraction analysis. Besides, in FIG. 2, the symbol θ designates an incident angle of the X-ray. The position of the diffraction peak of (004) $MgCr_2O_4$ having the spinel structure is registered in Powder Diffraction File (PDF) of the International Centre for Diffraction Data, under the registration number of 00-010-0351.

Figure 12:
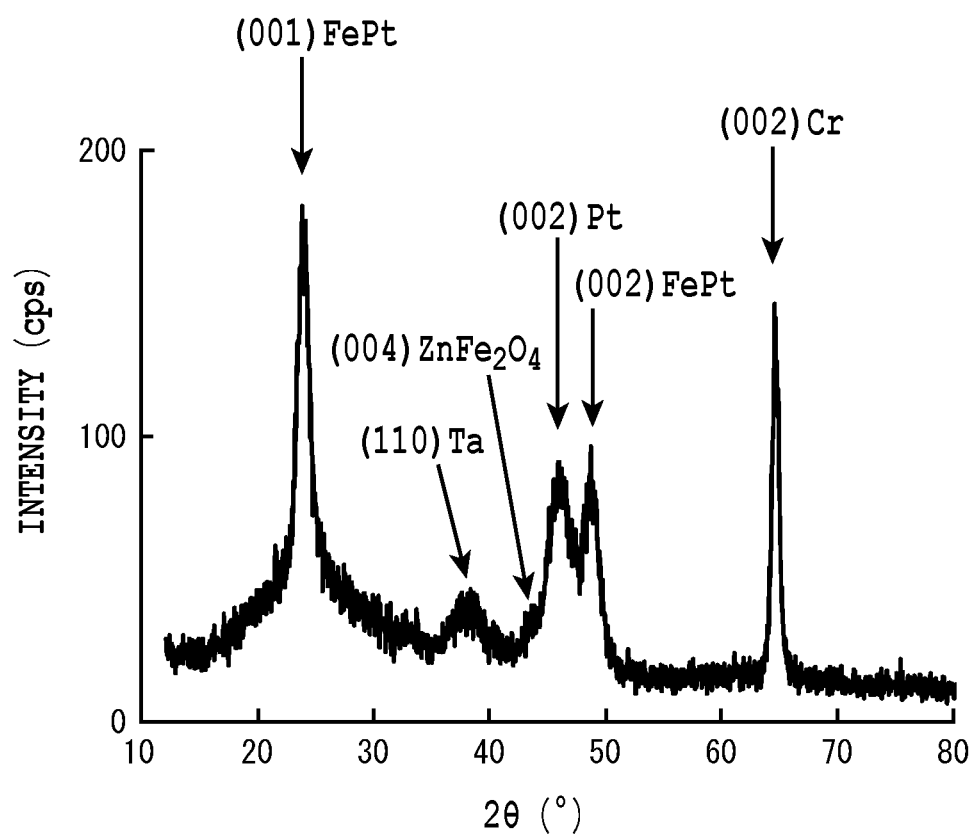
FIG. 12 is a view showing an X-ray diffraction (XRD) spectrum of the magnetic recording medium of Example 9.

The spinel structure (b) useful in this embodiment consists of Zn, Fe and O. The seed layer 20 may be constituted from $Zn(Zn_xFe_{1-x})_2O_{4(1-x)}$ ($0 \leq x \leq 0.25$) having a spinel structure. In other words, the Zn:Fe ratio in the compound $Zn(Zn_xFe_{1-x})_2O_{4(1-x)}$ is in a range from 1:1 ($x=0.25$) to 1:2 ($x=0$). By having the value of x within the above-described range, the compound $Zn(Zn_xFe_{1-x})_2O_{4(1-x)}$ has the spinel structure. As shown in FIG. 12, it is determined that a sample comprising $Zn(Zn_xFe_{1-x})_2O_{4(1-x)}$ has a spinel structure, if a curve indicating a diffraction peak lies on the position of the diffraction peak ($2\theta=42.7172°$) of (004) face of $ZnFe_2O_4$ having a spinel structure. By the way, the X-ray diffraction spectrum shown in FIG. 12 has been obtained from a magnetic recording medium having an FePt film and a Pt film disposed on its top surface.

Then, it is confirmed that $Zn(Zn_xFe_{1-x})_2O_{4(1-x)}$ ($0 \le x \le 0.25$) has a spinel structure due to coincidence of the X-ray diffraction peak. A Cu Kα ray (λ=0.1548 nm) is used for the X-ray diffraction analysis. Besides, in FIG. 12, the symbol θ designates an incident angle of the X-ray. The position of the diffraction peak of (004) $ZnFe_2O_4$ having the spinel structure is registered in Powder Diffraction File (PDF) of the International Centre for Diffraction Data, under the registration number of 01-070-6393.

Figure 11:
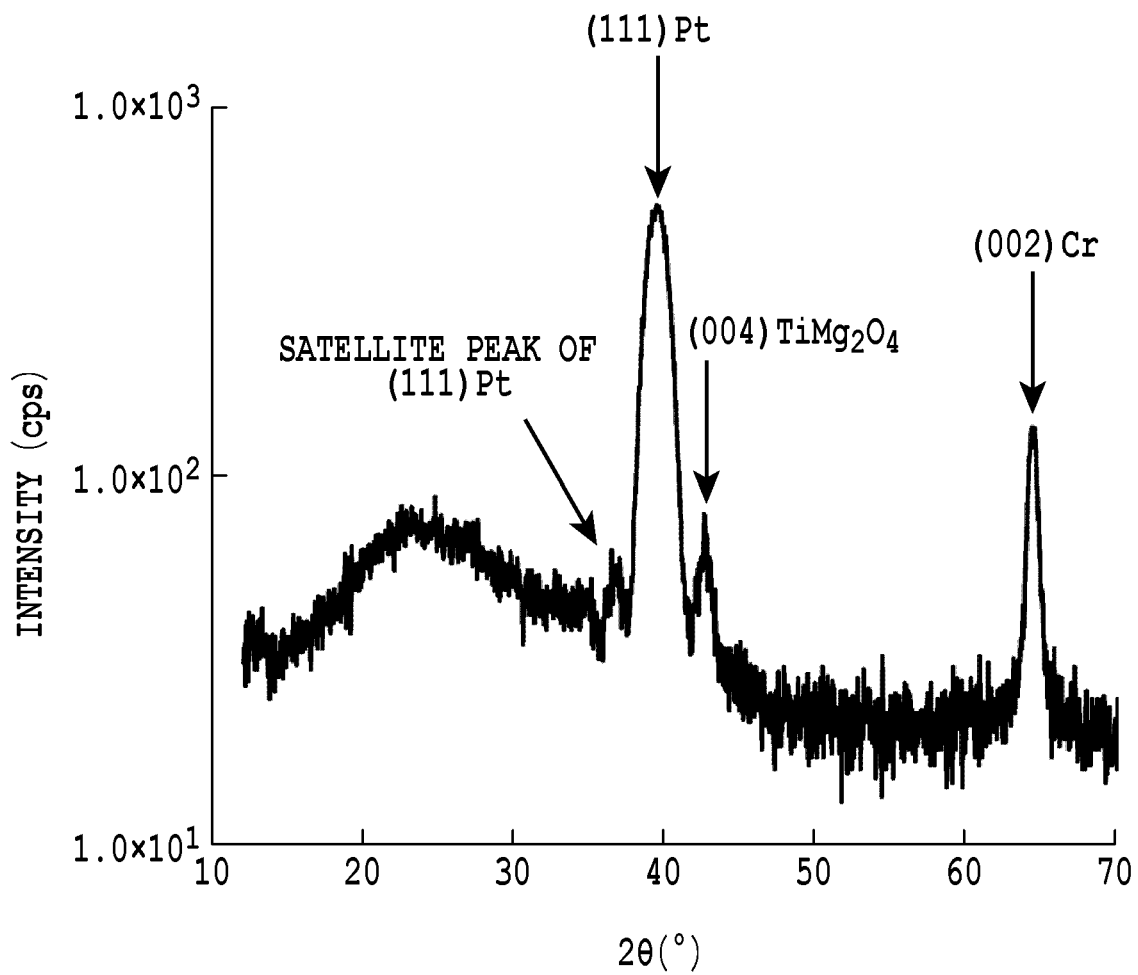
FIG. 11 is a view showing an X-ray diffraction (XRD) spectrum of the sample of Referential Example 2.

The inverse spinel structure (c) useful in this embodiment consists of Mg, Ti and O. The seed layer 20 may be constituted from $Mg_{2-x}Ti_{1+x}O_4$ ($-0.1 \le x \le 0.1$) having a spinel structure. In other words, the Mg:Ti ratio in the compound $Mg_{2-x}Ti_{1+x}O_4$ is in a range from 1.9:1.1 (x=0.1) to 2.1:0.9 (x=−0.1). By having the value of x within the above-described range, the compound $Mg_{2-x}Ti_{1+x}O_4$ has the spinel structure. The inverse spinel crystalline structure of $Mg_2TiO_4$ corresponding to the case where x is zero (0) in the above structural formula is disclosed in FIG. 1 of Japanese Patent Laid-Open No. 2014-034635, for example. As shown in FIG. 11, it is determined that a sample comprising $Mg_{2-x}Ti_{1+x}O_4$ has a spinel structure, if a curve indicating a diffraction peak lies on the position of the diffraction peak (2θ=) 42.823° of (004) face of $Mg_2TiO_4$ having the inverse spinel structure. By the way, the X-ray diffraction spectrum shown in FIG. 11 has been obtained from a sample of Referential Example 2 in which a Pt film is disposed on the top surface of the $Mg_2TiO_4$ layer.

Then, it is confirmed that $Mg_{2-x}Ti_{1+x}O_4$ ($-0.1 \le x \le 0.1$) has a spinel structure due to coincidence of the X-ray diffraction peak. A Cu Kα ray (λ=0.1548 nm) is used for the X-ray diffraction analysis. Besides, in FIG. 11, the symbol θ designates an incident angle of the X-ray. The position of the diffraction peak of (004) $Mg_2TiO_4$ having the inverse spinel structure is registered in Powder Diffraction File (PDF) of the International Centre for Diffraction Data, under the registration number of 00-025-1157.

The magnetic recording layer 30 of this embodiment may comprise an ordered alloy. The ordered alloy may be an alloy comprising at least one element selected from the group consisting of Fe and Co, and at least one element selected from the group consisting of Pt, Pd, Au and Ir. The preferable ordered alloy is an $L1_0$ ordered alloy selected from the group consisting of FePt, CoPt, FePd, and CoPd. The more preferable ordered alloy is the FePt alloy having the $L1_0$ ordered structure. The ordered alloy may further comprise at least one element selected from the group consisting of Ni, Mn, Cu, Ru, Ag, Au, Rh, Ir and Cr.

Alternatively, the magnetic recording layer may have a granular structure comprising magnetic crystal grains and a non-magnetic crystal grain boundary surrounding the magnetic crystal grains. The magnetic crystal grains may comprise the above-described ordered alloy. The non-magnetic crystal grain boundary may comprise at least one material selected from the group consisting of an oxide such as $SiO_2$, $TiO_2$ and ZnO, a nitride such as SiN and TiN, carbon (C), and boron (B). For example, the non-magnetic crystal grain boundary may comprise a mixture of carbon (C) and boron (B).

In the case where the magnetic recording layer has the granular structure, the α value of the M-H hysteresis loop can be brought close to the ideal value of 1 by the above-described seed layer. Determination of the α value is described below. The improvement in the α value exhibits that the magnetic crystal grains are well magnetically separated from each other. The improvement of the α value allows to increase a linear recording density by decreasing unevenness of magnetization reversal during magnetic recording, and/or to shrink the size of bits which are the minimum unit of magnetic recording.

Alternatively, the magnetic recording layer 30 may consist of a plurality of magnetic layers. Each of the plurality of magnetic layers may have either of a non-granular structure or the granular structure. Further, the magnetic recording layer 30 may have an exchange-coupled composite (ECC) structure in which a coupling layer such as Ru is interposed between the magnetic layers. Further, a second magnetic layer may be disposed on the top of the magnetic layer having the granular structure, as a continuous layer not having the granular structure (CAP layer).

Optionally, a protective layer (not shown) may be formed on the magnetic recording layer 30. The protective layer can be formed of a material conventionally used in the field of magnetic recording media. Specifically, the protective layer can be formed of non-magnetic metal such as Pt and Ta, a carbon-based material such as diamond-like carbon, or silicon-based material such as silicon nitride. The protective layer may be a single layer or have a stacked structure. The stacked structure of the protective layer may be a stacked structure of two types of carbon-based material having different characteristics from each other, a stacked structure of a metal and a carbon-based material, a stacked structure of two types of metals having different characteristics from each other, or a stacked structure of a metallic oxide film and a carbon-based material, for example. The protective layer can be formed by any process known in the art such as a sputtering method or a vacuum deposition method.

Further, a liquid lubricant layer (not shown) may be optionally formed on the protective layer. The liquid lubricant layer can be formed of a material conventionally used in the field of magnetic recording media (perfluoropolyether-based lubricants or the like, for example). The liquid lubricant layer can be formed by a coating method such as a dip-coating method or a spin-coating method.

The magnetic recording medium of this embodiment can be produced by a method comprising the steps of: preparing the substrate 10; forming the seed layer 20 by depositing a compound having a spinel structure (a) or (b), or an inverse spinel structure (c) onto the substrate 10; and forming the magnetic recording layer 30 onto the seed layer 20.

The first step of preparing the substrate comprises washing the non-magnetic support 12, forming optional layers such as the adhesive layer 14, the soft-magnetic under layer, the heat sink layer, and/or the interlayer 16 onto the surface of the non-magnetic support 12 over which the seed layer 20 will be formed, or the like.

The second step of forming the seed layer 20 comprises depositing the compound having the spinel structure (a) or (b), or the inverse spinel structure (c) onto the substrate 10. This step can be carried out by any method known in the art such as a sputtering method, or a vacuum deposition method. This step allows to obtain the seed layer 20 having a small surface roughness, and, in turn, to obtain the magnetic recording layer 30 having a small surface roughness.

In the case of using the sputtering method, a single target comprising the compound having the spinel structure (a) or (b), or the inverse spinel structure (c) may be used. Alternatively, a plurality of targets comprising oxides for constituting such compound separately. For example, in the case of depositing $Mg(Mg_xCr_{1-x})_2O_{4(1-x)}$, (1) a single target comprising $Mg(Mg_xCr_{1-x})_2O_{4(1-x)}$ or (2) the combination of a target comprising MgO and a target comprising ($Mg_x Cr_{1-x})_2 O_{3(1-x)}$ may be used. In the case of depositing $Zn(Zn_x Fe_{1-x})_2 O_{4(1-x)}$, (3) a single target comprising $Zn(Zn_x Fe_{1-x})_2 O_{4(1-x)}$ or (4) the combination of a target comprising ZnO and a target comprising ($Zn_x Fe_{1-x})_2 O_{3(1-x)}$ may be used. In the case of depositing $Mg_{2-x} Ti_{1+x} O_4$, (5) a single target comprising $Mg_{2-x} Ti_{1+x} O_4$ or (6) the combination of a target comprising MgO and a target comprising a Ti oxide may be used. The useful Ti oxide includes $Ti(IV)O_2$, $Ti(III)_2 O_3$, and $Ti(II)O$.

The third step of forming the magnetic recording layer 30 can be carried out by depositing the predetermined material by a sputtering method. In the case of forming the magnetic recording layer 30 comprising an ordered alloy, a target comprising material for constituting the ordered alloy can be used. More specifically, a target comprising the above-described elements constituting the ordered alloy at the predetermined ratio can be used. Alternatively, the magnetic recording layer 30 may be formed by using a plurality of targets comprising a single element, and adjusting electric power applied to the respective targets to control the ratio of the elements. In the case of forming the magnetic recording layer 30 having a granular structure is formed, a target comprising a material for forming magnetic crystal grains and a material for forming a non-magnetic crystal grain boundary at the predetermined ratio can be used. Alternatively, the magnetic recording layer 30 may be formed by using a target comprising the material for forming the magnetic crystal grains and a target comprising the material for forming the non-magnetic crystal grain boundary, and adjusting electric power applied to the respective targets to control the constitutional ratio of the magnetic crystal grains and the non-magnetic crystal grain boundary. Here, in the case where the magnetic crystal grains are formed from the ordered alloy, a plurality of targets which separately comprise the elements constituting the ordered alloy may be used.

In the case where the magnetic recording layer 30 comprises the ordered alloy, heating of the substrate is involved during formation of the magnetic recording layer 30. The substrate temperature in this case is within a range from 300° C. to 450° C. Adoption of the substrate temperature within this range allows to improve the order parameter of the ordered alloy in the magnetic recording layer 30.

EXAMPLE 1

A chemically strengthened glass substrate having a smooth surface (N-10 glass substrate manufactured by HOYA CORPORATION) was washed to prepare non-magnetic support 12. The washed non-magnetic support 12 was brought into a sputtering device. Then, Ta adhesive layer 14 having a thickness of 5 nm was formed by a DC magnetron sputtering method using a Ta target disposed 120 mm apart from the substrate in Ar gas at a pressure of 0.5 Pa. The electric power applied to the target was 100 W. The temperature of the non-magnetic support 12 during formation of the Ta adhesive layer 14 was room temperature.

Next, an MgO layer (not shown) having a thickness of 1 nm was formed by an RF magnetron sputtering method using an MgO target disposed 165 mm apart from the substrate in Ar gas at a pressure of 0.5 Pa. The electric power applied to the target was 200 W. In this step, the temperature of the non-magnetic support 12 on which the Ta adhesive layer 14 had been formed was room temperature.

Next, Cr interlayer 16 having a thickness of 20 nm was formed by a DC magnetron sputtering method using a Cr target disposed 120 mm apart from the substrate in Ar gas at a pressure of 0.25 Pa, to obtain substrate 10. The electric power applied to the target was 300 W.

Next, onto the stacked body in which the Cr interlayer 16 had been formed, $MgCr_2 O_4$ seed layer 20 having a thickness of 10 nm was formed by an RF magnetron sputtering method using an $MgCr_2 O_4$ target disposed 165 mm apart from the substrate 10 in Ar gas at a pressure of 1.5 Pa. The electric power applied to the target was 200 W. Here, the temperature of the substrate 10 was set to 430° C.

Next, the stacked body in which the seed layer 20 had been formed was heated to a temperature of 430° C., and FePt—C magnetic recording layer 30 having a thickness of 4 nm was formed by a DC magnetron sputtering method using a target comprising $Fe_{50} Pt_{50}$ and a target comprising C, both of which were disposed 165 mm apart from the substrate 10, in Ar gas at a pressure of 1.5 Pa. The electric power applied to the $Fe_{50} Pt_{50}$ target was 40 W, and the electric power applied to the C target was 139 W. Here, the FePt—C magnetic recording layer 30 comprised 25% by volume of C.

Subsequently, a protective layer (not shown) was formed by a DC magnetron sputtering method using a Pt target and a Ta target in Ar gas at a pressure of 0.5 Pa, to obtain a magnetic recording medium, wherein the protective layer is a stacked body of a Pt film having a thickness of 5 nm and a Ta film having a thickness of 5 nm. The substrate temperature during formation of the protective layer was room temperature (25° C.). The sputtering power during formation of the Pt film was 50 W, and the sputtering power during formation of the Ta film was 100 W.

Figure 3:
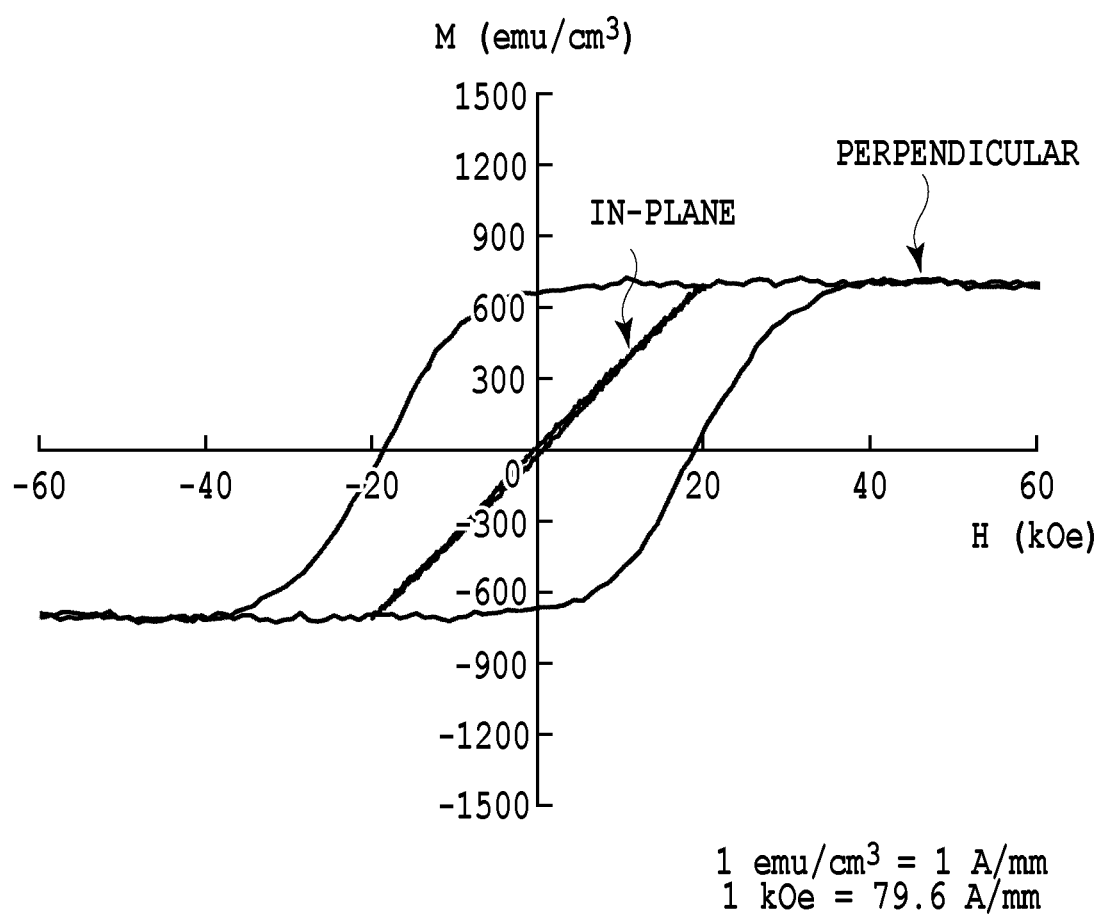
FIG. 3 is a view showing M-H hysteresis loops in the in-plain and perpendicular directions, of the magnetic recording medium of Example 1.

The M-H hysteresis loops in the in-plane and perpendicular directions of the resultant magnetic recording medium were measured with a PPMS apparatus (Physical Property Measurement System, manufactured by Quantum Design, Inc.). The resultant M-H hysteresis loops are shown in FIG. 3. Coercive force in the in-plane direction $Hc_{IP}$, and an α value of the hysteresis loop in the perpendicular direction were determined from the resultant M-H hysteresis loops. The Coercive force in the in-plane direction $Hc_{IP}$ was 0.61 kOe (48.5 A/mm), although the preferable $Hc_{IP}$ is 0 kOe (0 A/mm). The perpendicular orientation characteristic of the FePt film can be confirmed by the magnitude of the coercive force in the in-plane direction. If no disturbance is present in the orientation, all of magnetization are oriented in the perpendicular direction, and the in-plane direction becomes a direction of an axis of difficult magnetization. Therefore, the magnetization curve in the in-plane direction becomes a straight line, and the coercive force in the in-plane direction becomes zero (0). If the orientation is disturbed, the orientation of the magnetization is also disturbed so that the magnetization curve ceases to be a straight line to develop the coercive force in the in-plain direction. In perpendicular magnetic recording, deterioration of the perpendicular orientation characteristic (that is, development and increase of $Hc_{IP}$) is unpreferable, due to increase of locations in which errors occur in recording. The "α value of the hysteresis loop" means a slope of the magnetization curve in the vicinity of the coercive force (H=Hc), and calculated by the equation of $α=4π×(dM/dH)$. When determining the α value, a unit "emu/cm$^3$" is used as the unit of M, and a unit "Oe" is used as the unit of H. The α value increases if the magnetic crystal grains in the magnetic recording layer 30 are not magnetically separated well. On the other hand, the α value decreases if the magnetic properties of the magnetic crystal grains vary greatly, in such a case where crystal grains due to secondary growth are present. The α value is preferably in a range of 0.75 or more and less than 3.0, and more preferably in a range of 0.9 or more and less than 2.0. Further, the magnetic anisotropy constant Ku was determined by evaluating, with a PPMS apparatus, the dependence of spontaneous magnetization on the angle at which the magnetic field is applied. The methods described in the publications: R. F. Penoyer, "Automatic Torque Balance for Magnetic Anisotropy Measurement", The Review of Scientific Instruments, August 1959, Vol. 30, No. 8, pp. 711-714; and Soshin Chikazumi, "Physics of ferromagnetism Vol. II", Shokabo Co., Ltd., pp. 10-21 were used in determination of the magnetic anisotropy constant Ku. The results are shown in Table 1.

EXAMPLE 2

Figure 4:
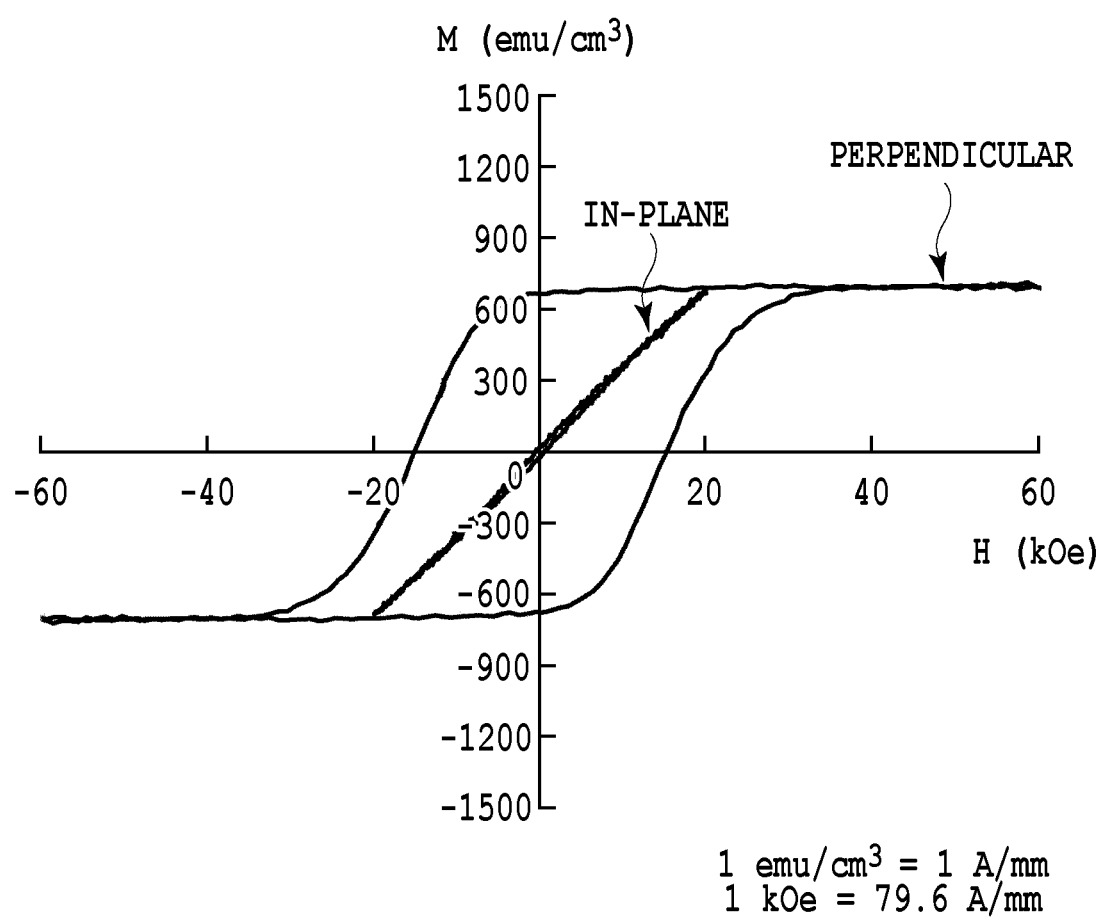
FIG. 4 is a view showing M-H hysteresis loops in the in-plain and perpendicular directions, of the magnetic recording medium of Example 2.

A magnetic recording medium was obtained by repeating the procedure of Example 1, except that the thickness of the $MgCr_2O_4$ seed layer 20 was changed to 5 nm. The resultant M-H hysteresis loops are shown in FIG. 4. The measurement results of the α value of hysteresis loop in the perpendicular direction, the coercive force in the in-plane direction $Hc_{IP}$, and the magnetic anisotropy constant Ku of the resultant magnetic recording medium are shown in Table 1.

Figure 13:
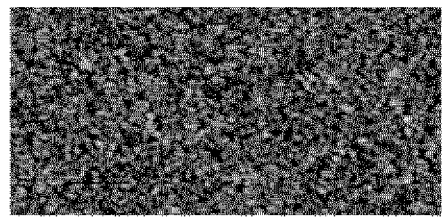
FIG. 13 is a view showing atomic force microscopic (AFM) images of the surfaces of the magnetic recording media, FIGS. 13(*a*), 13(*b*), and 13(*c*) are views showing the AFM images of the surfaces of the magnetic recording media of Example 2, Example 4, and Comparative Example 1, respectively.
Figure 13:
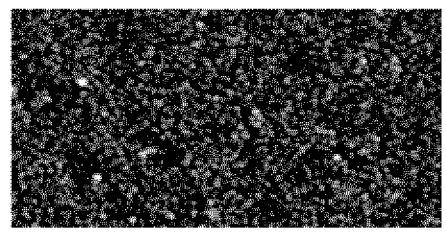
Figure 13:
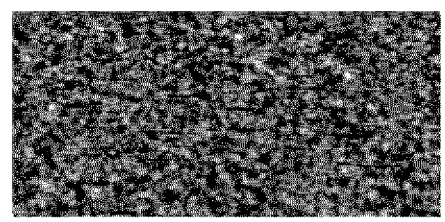

Further, an arithmetic average roughness Ra of the surface of the resultant magnetic recording medium was measured. The arithmetic average roughness Ra was measured by observation of a measurement area of 1 μm by 0.5 μm with an AFM. The AFM image is shown in FIG. 13(a), and the measured value of the arithmetic average roughness Ra is shown in Table 1.

EXAMPLE 3

Figure 5:
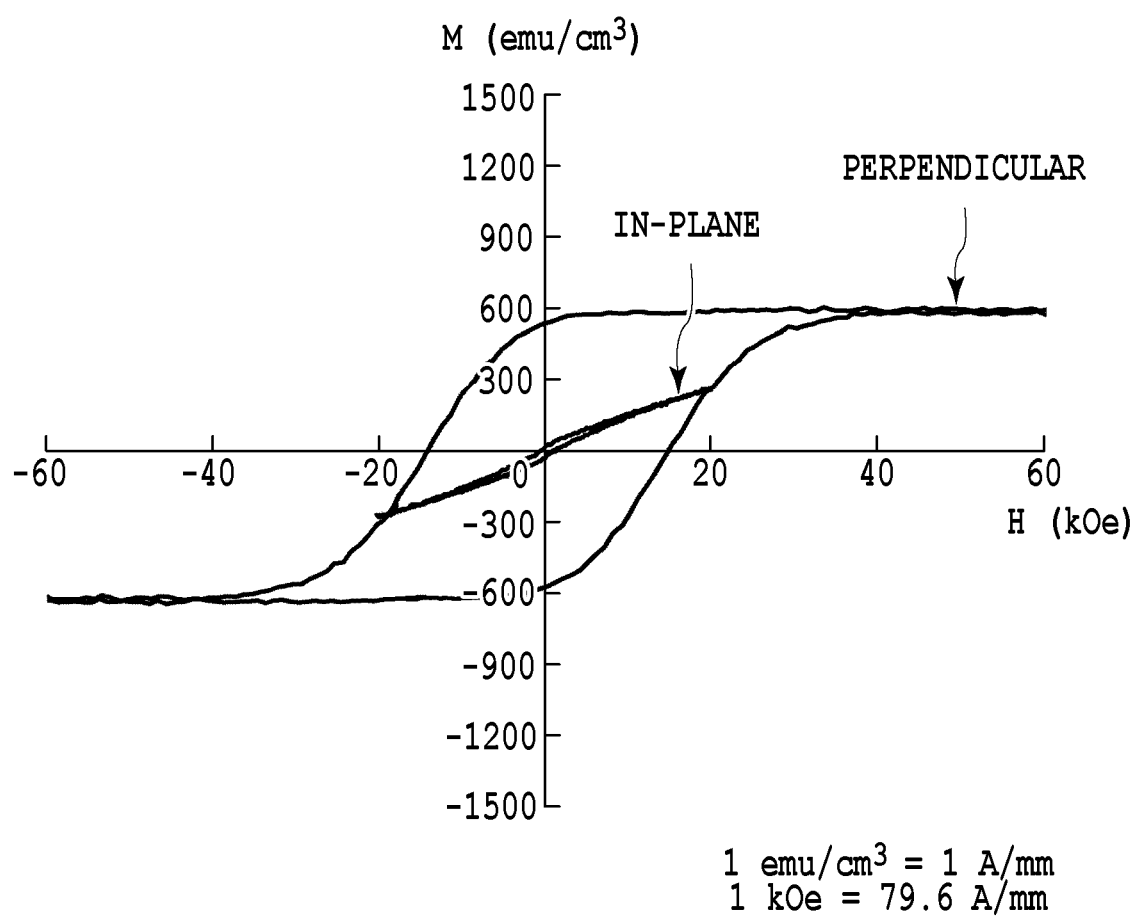
FIG. 5 is a view showing M-H hysteresis loops in the in-plain and perpendicular directions, of the magnetic recording medium of Example 3.

A magnetic recording medium was obtained by repeating the procedure of Example 1, except that the target for forming the seed layer 20 was changed to an $Mg_2TiO_4$ target, and the temperature of the substrate 10 during formation of the seed layer 20 was changed to 300° C. The resultant M-H hysteresis loops are shown in FIG. 5. The measurement results of the α value of hysteresis loop in the perpendicular direction, the coercive force in the in-plane direction $Hc_{IP}$, and the magnetic anisotropy constant Ku of the resultant magnetic recording medium are shown in Table 1.

EXAMPLE 4

Figure 6:
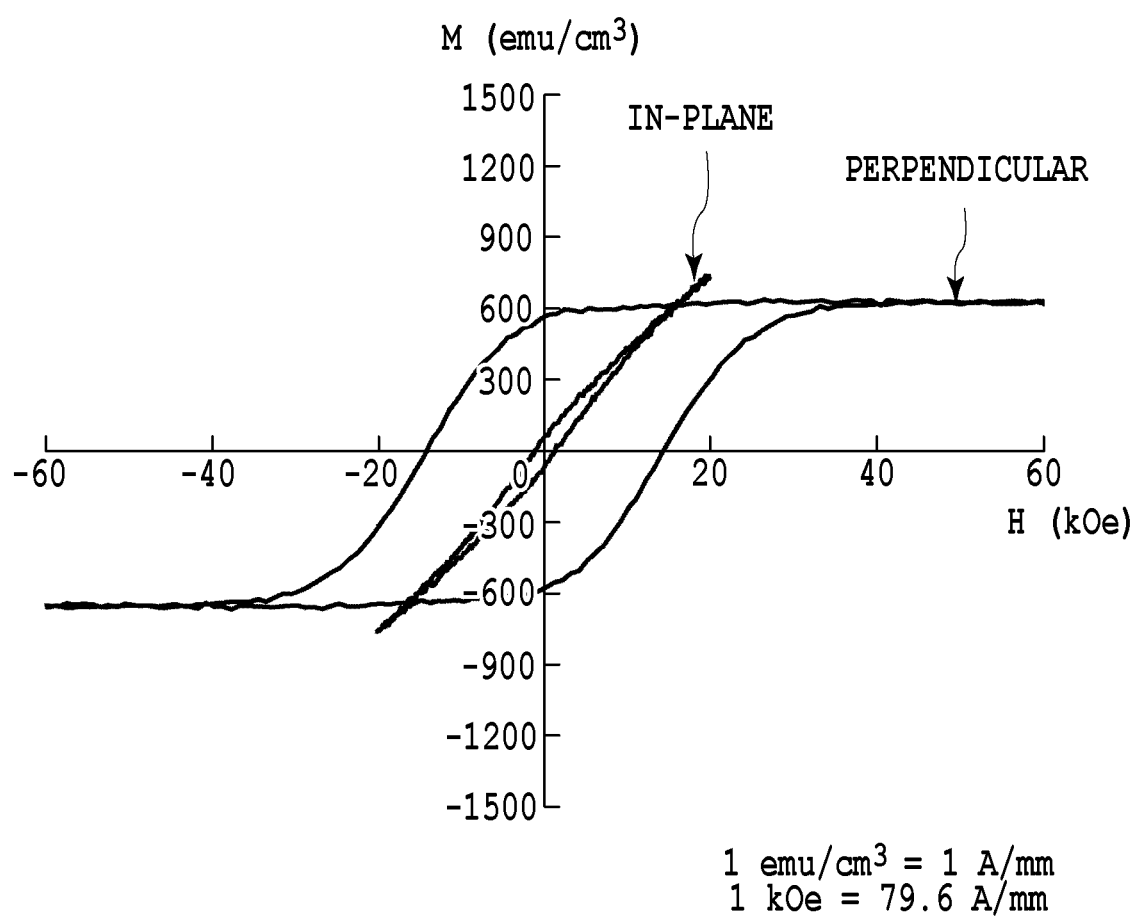
FIG. 6 is a view showing M-H hysteresis loops in the in-plain and perpendicular directions, of the magnetic recording medium of Example 4.

A magnetic recording medium was obtained by repeating the procedure of Example 3, except that the thickness of the $Mg_2TiO_4$ seed layer was changed to 5 nm. The resultant M-H hysteresis loops are shown in FIG. 6. The AFM image is shown in FIG. 13(b). The measurement results of the α value of hysteresis loop in the perpendicular direction, the coercive force in the in-plane direction $Hc_{IP}$, the magnetic anisotropy constant Ku, and the arithmetic average roughness Ra of the resultant magnetic recording medium are shown in Table 1.

COMPARATIVE EXAMPLE 1

Figure 7:
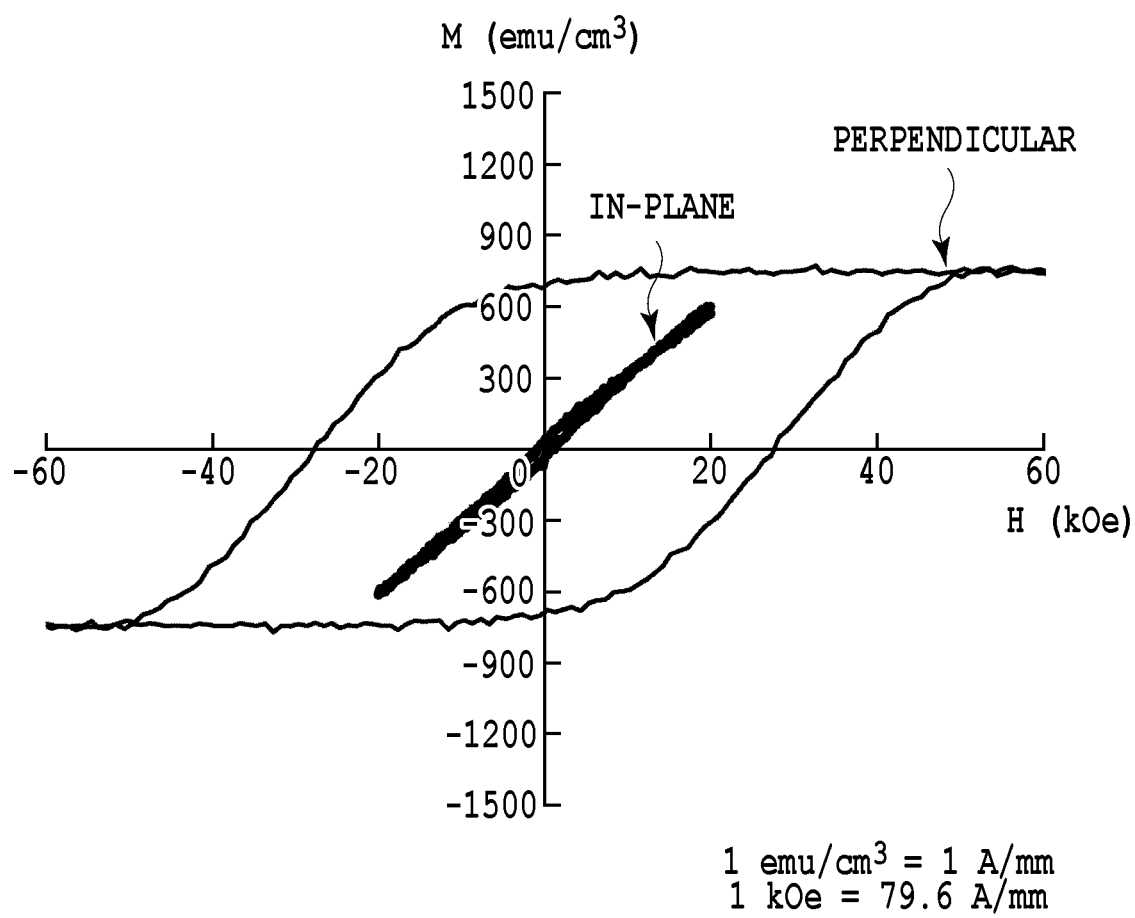
FIG. 7 is a view showing M-H hysteresis loops in the in-plain and perpendicular directions, of the magnetic recording medium of Comparative Example 1.

A magnetic recording medium was obtained by repeating the procedure of Example 1, except that MgO seed layer 20 was formed by the following procedure. The MgO seed layer 20 having a thickness of 5 nm was formed by an RF magnetron sputtering method using an MgO target disposed 165 mm apart from the substrate in Ar gas at a pressure of 0.1 Pa. The electric power applied to the target was 200 W. Here, the temperature of the substrate 10 was set to 430° C. The resultant M-H hysteresis loops are shown in FIG. 7. The measurement results of the α value of hysteresis loop in the perpendicular direction, the coercive force in the in-plane direction $Hc_{IP}$, and the magnetic anisotropy constant Ku of the resultant magnetic recording medium are shown in Table 1. Further, the AFM image of the surface of the magnetic recording medium is shown in FIG. 13(c), and the measured value of the arithmetic surface roughness Ra is shown in Table 1.

TABLE 1

Constitution and Properties of Magnetic Recording Medium
(Magnetic Recording Layer: FePt-25 vol. % of C, Thickness is 4 nm)

| | Seed layer*[1] | α (perpendicular) | Arithmetic average roughness Ra (nm) | $Hc_{IP}$*[2] (kOe) | Ku*[3] (×10⁷ erg/cm³) |
|---|---|---|---|---|---|
| Ex. 1 | $MgCr_2O_4$ (10) | 0.84 | 0.383 | 0.61 | 1.77 |
| Ex. 2 | $MgCr_2O_4$ (5) | 1.0 | 0.359 | 0.54 | 1.73 |
| Ex. 3 | $MgTi_2O_4$ (10) | 0.73 | — | 0.78 | 1.21 |
| Ex. 4 | $MgTi_2O_4$ (5) | 0.76 | 0.395 | 1.20 | 1.32 |
| C. Ex. 1 | MgO (5) | 0.59 | 0.501 | 0.90 | 2.24 |

*[1] The value in parentheses shows a thickness (nm).
*[2] 1 kOe = 79.6 A/mm
*[3] $10^7$ erg/cm³ = 1 J/cm³

EXAMPLE 5

Figure 8:
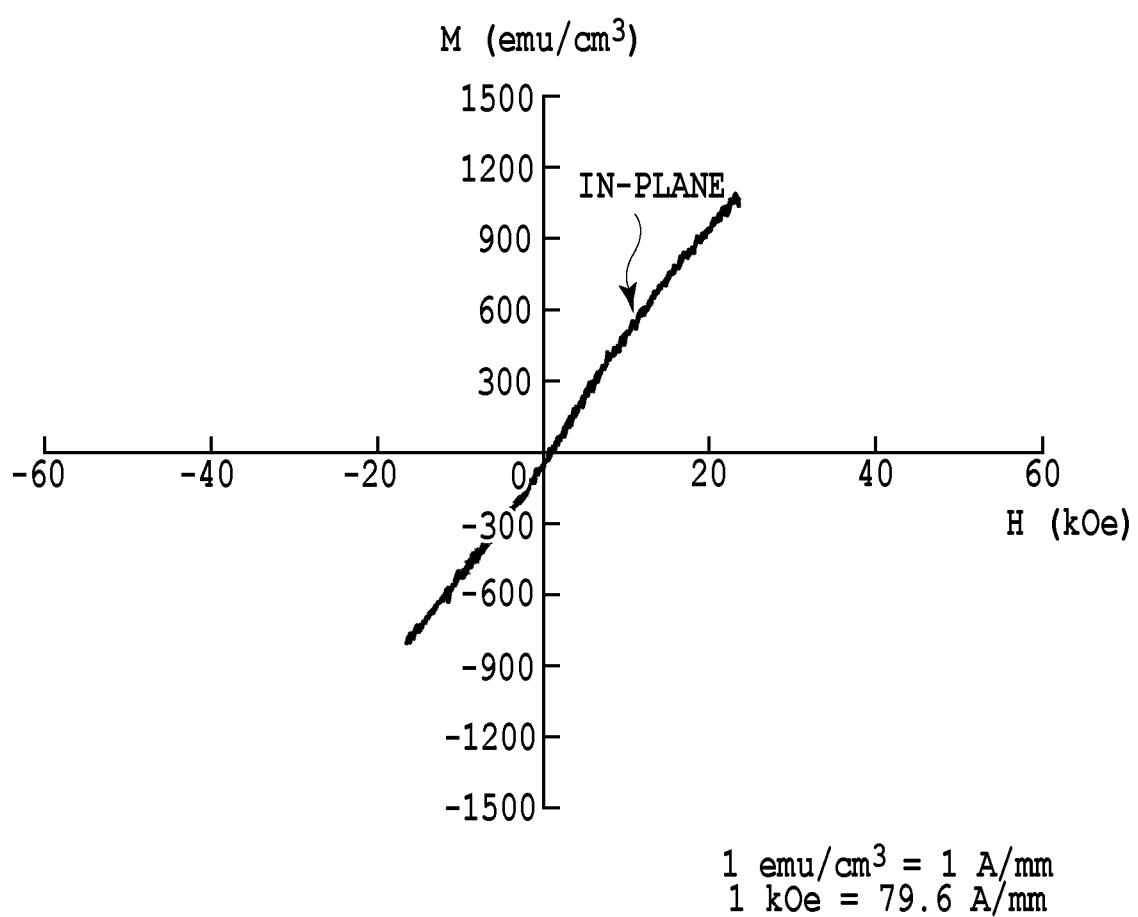
FIG. 8 is a view showing an M-H hysteresis loop in the in-plain direction, of the magnetic recording medium of Example 5.

A magnetic recording medium was obtained by repeating the procedure of Example 1, except that the electric power applied to the C target during formation of the FePt—C magnetic recording layer 30 was changed to 234 W so that the C content in the FePt—C magnetic recording layer 30 was changed to 40% by volume, and that the thickness of the FePt—C magnetic recording layer 30 was changed to 2 nm. The resultant M-H hysteresis loop is shown in FIG. 8. The measurement result of the coercive force in the in-plane direction $Hc_{IP}$ of the resultant magnetic recording medium is shown in Table 2.

EXAMPLE 6

Figure 9:
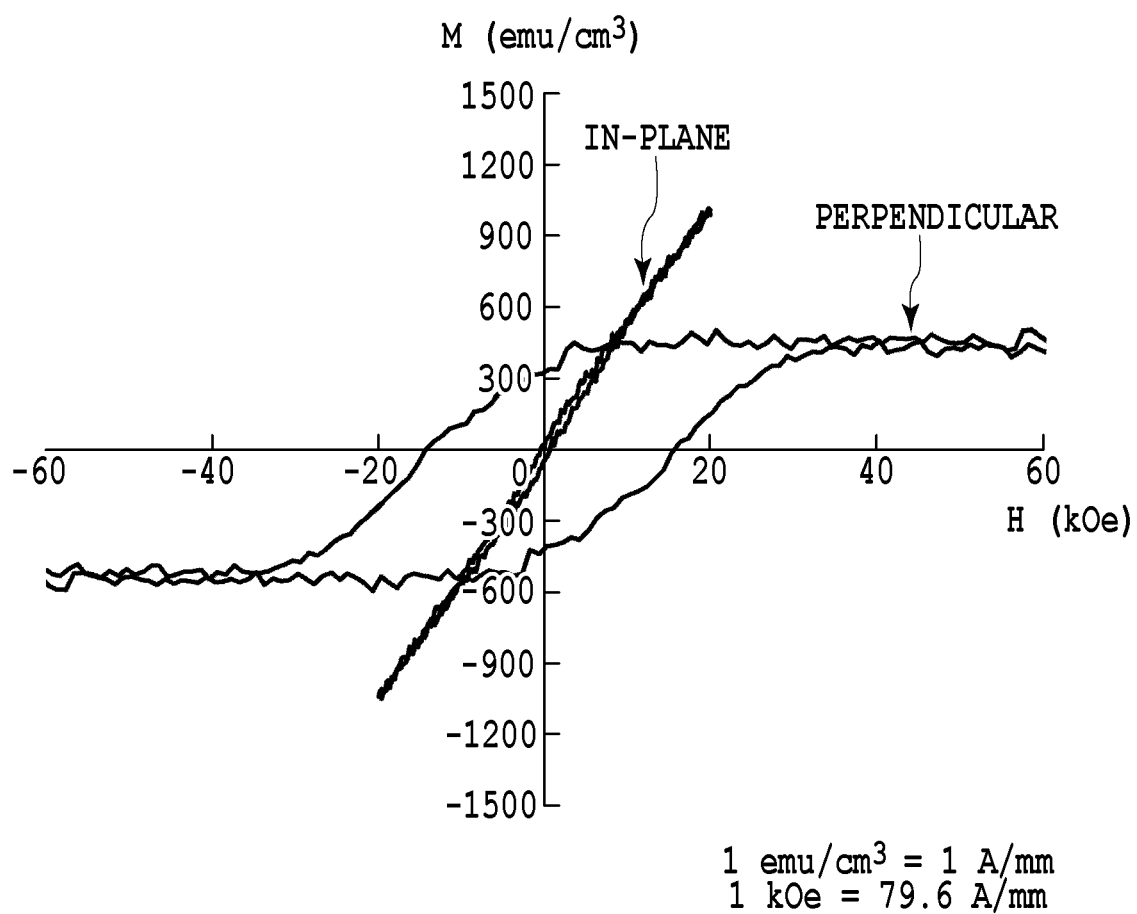
FIG. 9 is a view showing M-H hysteresis loops in the in-plain and perpendicular directions, of the magnetic recording medium of Example 6.

A magnetic recording medium was obtained by repeating the procedure of Example 3, except that the electric power applied to the C target during formation of the FePt—C magnetic recording layer 30 was changed to 234 W so that the C content in the FePt—C magnetic recording layer 30 was changed to 40% by volume, and that the thickness of the FePt—C magnetic recording layer 30 was changed to 2 nm. The resultant M-H hysteresis loops are shown in FIG. 9. The measurement results of the α value of hysteresis loop in the perpendicular direction, the coercive force in the in-plane direction $Hc_{IP}$, and the magnetic anisotropy constant Ku of the resultant magnetic recording medium are shown in Table 2.

COMPARATIVE EXAMPLE 2

Figure 10:
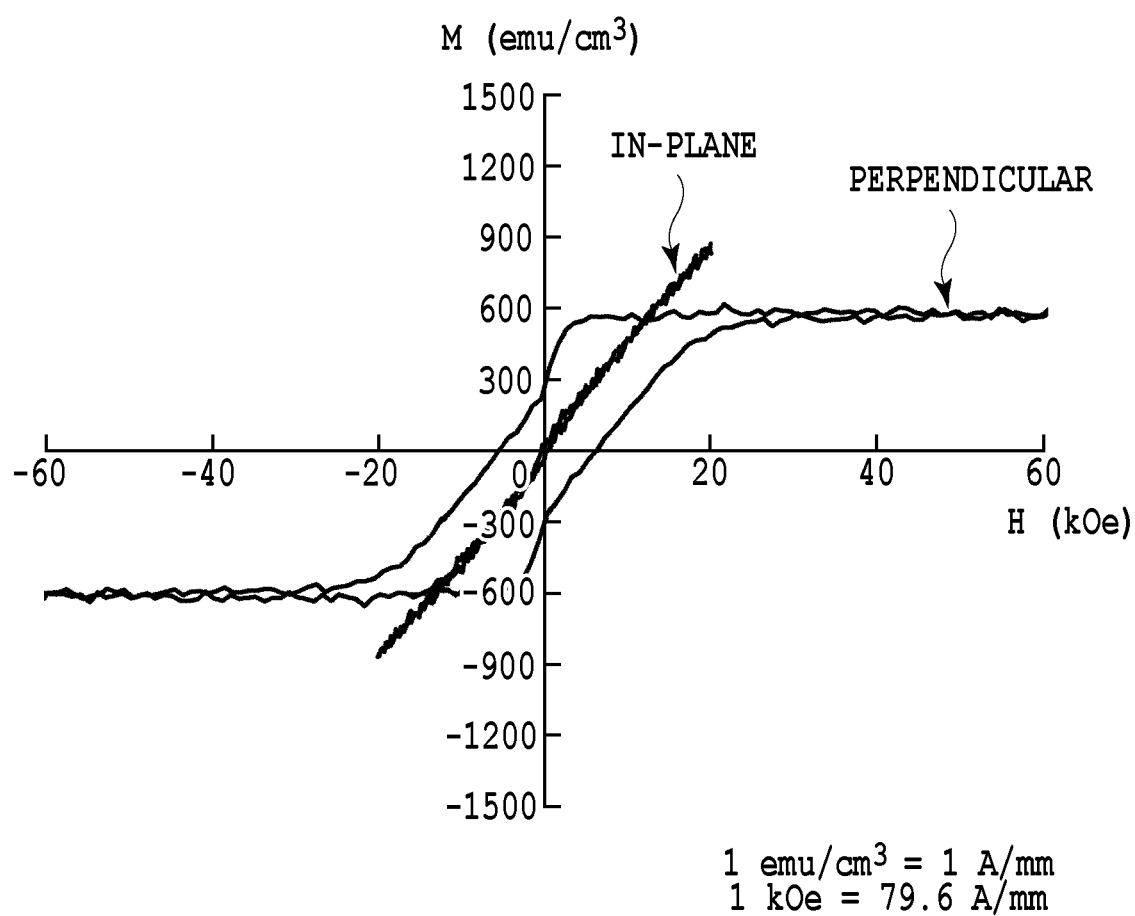
FIG. 10 is a view showing M-H hysteresis loops in the in-plain and perpendicular directions, of the magnetic recording medium of Comparative Example 2.

A magnetic recording medium was obtained by repeating the procedure of Example 5, except that the MgO seed layer 20 was formed in accordance with the procedure described in Comparative Example 1. The measurement result of the coercive force in the in-plane direction $Hc_{IP}$ of the resultant magnetic recording medium is shown in Table 2. The resultant M-H hysteresis loops are shown in FIG. 10. The measurement results of the α value of hysteresis loop in the perpendicular direction, the coercive force in the in-plane direction $Hc_{IP}$, and the magnetic anisotropy constant Ku of the resultant magnetic recording medium are shown in Table 2.

TABLE 2

Constitution and Properties of Magnetic Recording Medium
(Magnetic Recording Layer: FePt-40 vol. % of C, Thickness is 2 nm)

| Seed layer*1 | α (perpendicular) | Arithmetic average roughness Ra (nm) | $Hc_{IP}$*2 (kOe) | Ku*3 (×10⁷ erg/cm³) |
|---|---|---|---|---|
| Ex. 5 $MgCr_2O_4$ (10) | — | 0.253 | 0.18 | 0.93 |
| Ex. 6 $MgTi_2O_4$ (10) | 0.57 | — | 0.53 | 1.14 |
| C. Ex. 1 MgO (5) | 0.56 | 0.360 | 0.31 | 1.11 |

*1The value in parentheses shows a thickness (nm).
*2 1 kOe = 79.6 A/mm
*3 10⁷ erg/cm³ = 1 J/cm³

EXAMPLE 7A

Figure 14:
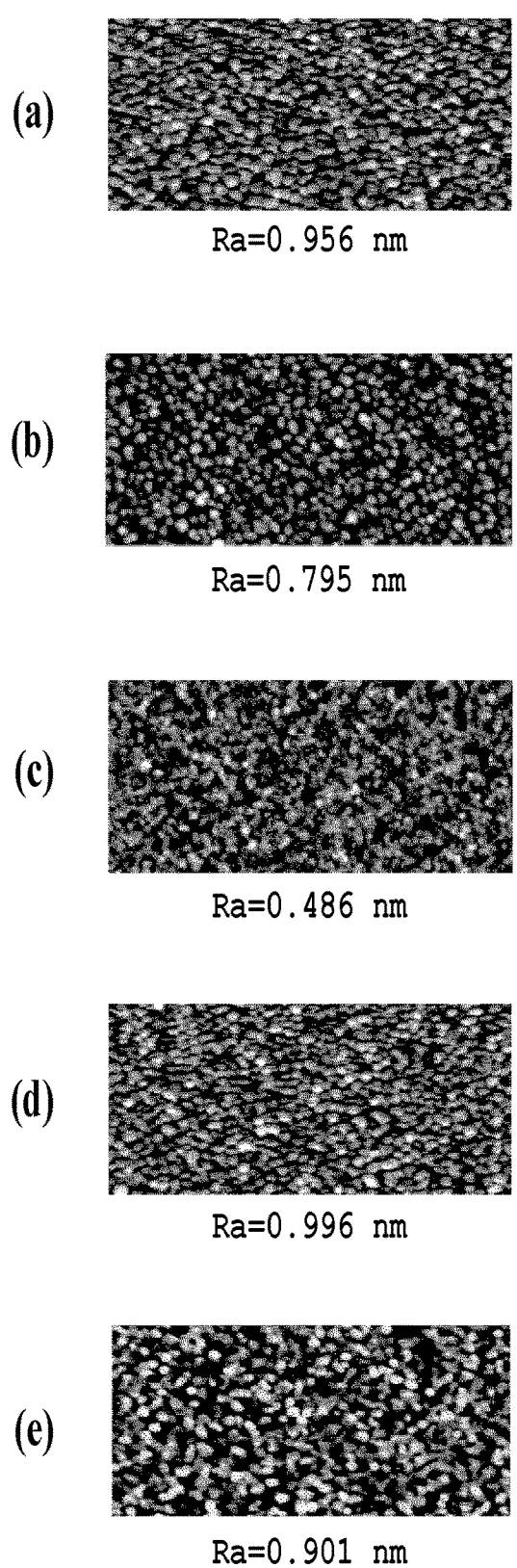
FIG. 14 is a view showing atomic force microscopic (AFM) images of the surfaces of the magnetic recording media, FIGS. 14(*a*) to 14(*e*) are views showing the AFM images of the surfaces of the magnetic recording media of Example 7A, Example 8A, Example 9, Comparative Example 3, and Comparative Example 4, respectively.

A magnetic recording medium having the FePt magnetic recording layer 30 was obtained by repeating the procedure of Example 1, except that the C target was not used during formation of the magnetic recording layer 30. The measurement results of the α value of hysteresis loop in the perpendicular direction, the coercive force in the in-plane direction $Hc_{1P}$, and the magnetic anisotropy constant Ku of the resultant magnetic recording medium are shown in Table 3. Further, the AFM image of the surface of the magnetic recording medium is shown in FIG. 14(a), and the measurement value of the arithmetic surface roughness Ra is shown in Table 3.

EXAMPLE 7B

A magnetic recording medium having the FePt magnetic recording layer 30 was obtained by repeating the procedure of Example 7A, except that the thickness of the magnetic recording layer 30 to be formed was changed to 10 nm. The measurement results of the α value of hysteresis loop in the perpendicular direction, the coercive force in the in-plane direction $Hc_{1P}$, and the magnetic anisotropy constant Ku of the resultant magnetic recording medium are shown in Table 3.

EXAMPLE 8A

A magnetic recording medium having the FePt magnetic recording layer 30 was obtained by repeating the procedure of Example 3, except that the C target was not used during formation of the magnetic recording layer 30. The measurement results of the α value of hysteresis loop in the perpendicular direction, the coercive force in the in-plane direction $Hc_{IP}$, and the magnetic anisotropy constant Ku of the resultant magnetic recording medium are shown in Table 3. Further, the AFM image of the surface of the magnetic recording medium is shown in FIG. 14(b), and the measurement value of the arithmetic surface roughness Ra is shown in Table 3.

EXAMPLE 8B

A magnetic recording medium having the FePt magnetic recording layer 30 was obtained by repeating the procedure of Example 8A, except that the thickness of the magnetic recording layer 30 to be formed was changed to 10 nm. The measurement results of the α value of hysteresis loop in the perpendicular direction, the coercive force in the in-plane direction $Hc_{IP}$, and the magnetic anisotropy constant Ku of the resultant magnetic recording medium are shown in Table 3.

EXAMPLE 9

A chemically strengthened glass substrate having a smooth surface (N-10 glass substrate manufactured by HOYA CORPORATION) was washed to prepare non-magnetic support 12. The washed non-magnetic support 12 was brought into a sputtering device. Then, Ta adhesive layer 14 having a thickness of 5 nm was formed by an RF magnetron sputtering method using a Ta target disposed 180 mm apart from the substrate in Ar gas at a pressure of 0.20 Pa. The electric power applied to the target was 200 W. The temperature of the non-magnetic support 12 during formation of the Ta adhesive layer 14 was room temperature.

Next, an MgO layer (not shown) having a thickness of 1 nm was formed by an RF magnetron sputtering method using an MgO target disposed 180 mm apart from the substrate in Ar gas at a pressure of 0.20 Pa. The electric power applied to the target was 200 W. In this step, the temperature of the non-magnetic support 12 on which the Ta adhesive layer 14 had been formed was room temperature.

Next, Cr interlayer 16 having a thickness of 20 nm was formed by an RF magnetron sputtering method using a Cr target disposed 180 mm apart from the substrate in Ar gas at a pressure of 0.20 Pa, to obtain substrate 10. The electric power applied to the target was 600 W.

Next, onto the substrate 10, $ZnFe_2O_4$ seed layer 20 having a thickness of 10 nm was formed by an RF magnetron sputtering method using an $ZnFe_2O_4$ target disposed 180 mm apart from the substrate 10 in Ar gas at a pressure of 0.20 Pa. The electric power applied to the target was 500 W. Here, the temperature of the substrate 10 was room temperature.

Next, the stacked body in which the seed layer 20 had been formed was heated to a temperature of 350° C., and FePt—C magnetic recording layer 30 having a thickness of 10 nm was formed by an RF magnetron sputtering method using a target comprising $Fe_{50}Pt_{50}$ and a target comprising C, both of which were disposed 240 mm apart from the substrate 10, in Ar gas at a pressure of 0.90 Pa. The electric power applied to the $Fe_{50}Pt_{50}$ target was 300 W.

Subsequently, a protective layer (not shown) was formed by a DC magnetron sputtering method using a Pt target and a Ta target in Ar gas at a pressure of 0.18 Pa, to obtain a magnetic recording medium, wherein the protective layer is a stacked body of a Pt film having a thickness of 5 nm and a Ta film having a thickness of 5 nm. The substrate temperature during formation of the protective layer was room temperature (25° C.). The Pt target and the Ta target were disposed 320 mm apart from the substrate 10. The sputtering power during formation of the Pt film was 100 W, and the sputtering power during formation of the Ta film was 200 W.

The measurement results of the α value of hysteresis loop in the perpendicular direction, and the coercive force in the in-plane direction $Hc_{IP}$ of the resultant magnetic recording medium are shown in Table 3. Further, the AFM image of the surface of the resultant magnetic recording medium is shown in FIG. 14(c), and the measurement value of the arithmetic surface roughness Ra is shown in Table 3.

COMPARATIVE EXAMPLE 3

A magnetic recording medium was obtained by repeating the procedure of Example 7A, except that the MgO seed layer 20 was formed in accordance with the procedure described in Comparative Example 1. The measurement result of the coercive force in the in-plane direction $Hc_{Ip}$ of the resultant magnetic recording medium is shown in Table 3. The measurement results of the α value of hysteresis loop in the perpendicular direction, the coercive force in the in-plane direction $Hc_{IP}$, and the magnetic anisotropy constant Ku of the resultant magnetic recording medium are shown in Table 3. Further, the AFM image of the surface of the resultant magnetic recording medium is shown in FIG. 14(d), and the measurement value of the arithmetic surface roughness Ra is shown in Table 3.

COMPARATIVE EXAMPLE 4

A magnetic recording medium was obtained by repeating the procedure of Example 9, except that MgO seed layer 20 was formed by the following procedure. The MgO seed layer 20 having a thickness of 10 nm was formed by an RF magnetron sputtering method using an MgO target disposed 240 mm apart from the substrate in Ar gas at a pressure of 0.18 Pa. The electric power applied to the target was 500 W. Here, the temperature of the substrate 10 was set to 450° C. The measurement results of the α value of hysteresis loop in the perpendicular direction, and the coercive force in the in-plane direction $Hc_{IP}$ of the resultant magnetic recording medium are shown in Table 3. Further, the AFM image of the surface of the resultant magnetic recording medium is shown in FIG. 14(e), and the measurement value of the arithmetic surface roughness Ra is shown in Table 3.

TABLE 3

Constitution and Properties of Magnetic Recording Medium (Magnetic Recording Layer: FePt)

| | Seed layer*1 | Thickness of Magnetic Recording Layer (nm) | α (perpendicular) | Arithmetic average roughness Ra (nm) | $Hc_{IP}$*2 (kOe) | Ku*3 (×10$^7$ erg/cm$^3$) |
|---|---|---|---|---|---|---|
| Ex. 7A | MgCr$_2$O$_4$ (10) | 4 | 1.6 | 0.956 | 1.1 | 2.41 |
| Ex. 7B | MgCr$_2$O$_4$ (10) | 10 | 4.5 | | 2.8 | 2.85 |
| Ex. 8A | MgTi$_2$O$_4$ (10) | 4 | 1.6 | 0.795 | 3.1 | 1.22 |
| Ex. 8B | MgTi$_2$O$_4$ (10) | 10 | 2.1 | | 4.9 | 2.8 |
| Ex. 9 | ZnFe$_2$O$_4$ (10) | 10 | 5.2 | 0.486 | 4.7 | 1.6 |
| C. Ex. 3 | MgO (10) | 4 | 1.3 | 0.996 | 1.7 | 2.45 |
| C. Ex. 4 | MgO (5) | 10 | 9.6 | 0.901 | 3.3 | 2.2 |

*1The value in parentheses shows a thickness (nm).
*2 1 kOe = 79.6 A/mm
*3 10$^7$ erg/cm$^3$ = 1 J/cm$^3$

REFERENTIAL EXAMPLE 1

Figure 15:
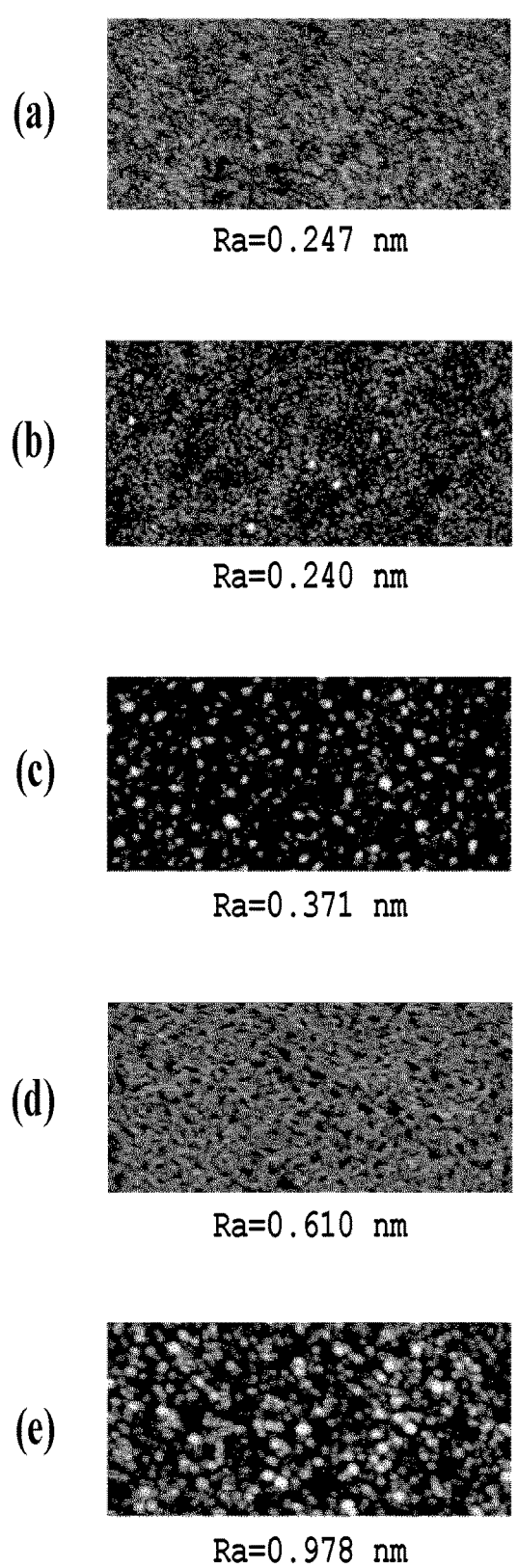
FIG. 15 is a view showing atomic force microscopic (AFM) images of the surfaces of the sample in which the seed layer is the top layer, FIGS. 15(*a*) to 15(*e*) are views showing the AFM images of the surfaces of the samples of Referential Examples 1 to 5, respectively.

A sample for measuring the surface roughness of the seed layer was obtained by repeating the procedure of Example 1, except that the FePt—C magnetic recording layer 30 and the Ta film in the protective layer were not formed. In the sample of this referential example, the Pt film having a thickness of 5 nm was present on the seed layer. The AFM image of the surface of the resultant sample is shown in FIG. 15(a), and the measured value of the arithmetic average roughness Ra is shown in Table 4.

REFERENTIAL EXAMPLE 2

A sample for measuring the surface roughness of the seed layer was obtained by repeating the procedure of Example 3, except that the FePt—C magnetic recording layer 30 and the Ta film in the protective layer were not formed. In the sample of this referential example, the Pt film having a thickness of 5 nm was present on the seed layer. The XRD spectrum of the resultant sample is shown in FIG. 11. The AFM image of the surface of the resultant sample is shown in FIG. 15(b), and the measured value of the arithmetic average roughness Ra is shown in Table 4.

REFERENTIAL EXAMPLE 3

A sample for measuring the surface roughness of the seed layer was obtained by repeating the procedure of Example 9, except that the FePt—C magnetic recording layer 30 and the protective layer were not formed. In the sample of this referential example, the seed layer was the top-most layer. The AFM image of the surface of the resultant sample is shown in FIG. 15(c), and the measured value of the arithmetic average roughness Ra is shown in Table 4.

REFERENTIAL EXAMPLE 4

A sample for measuring the surface roughness of the seed layer was obtained by repeating the procedure of Comparative Example 1, except that the FePt—C magnetic recording layer 30 and the Ta film in the protective layer were not formed. In the sample of this referential example, the Pt film having a thickness of 5 nm was present on the seed layer. The AFM image of the surface of the resultant sample is shown in FIG. 15(d), and the measured value of the arithmetic average roughness Ra is shown in Table 4.

REFERENTIAL EXAMPLE 5

A sample for measuring the surface roughness of the seed layer was obtained by repeating the procedure of Comparative Example 4, except that the FePt—C magnetic recording layer 30 and the protective layer were not formed. In the sample of this referential example, the seed layer was the top-most layer. The AFM image of the surface of the resultant sample is shown in FIG. 15(e), and the measured value of the arithmetic average roughness Ra is shown in Table 4.

TABLE 4

Evaluation of the Surface Roughness of the Seed Layer

| | Seed layer*1 | Pt film (nm) | Arithmetic average roughness Ra (nm) |
|---|---|---|---|
| R. Ex. 1 | MgCr$_2$O$_4$ (10) | 5 | 0.247 |
| R. Ex. 2 | MgTi$_2$O$_4$ (10) | 5 | 0.240 |
| R. Ex. 3 | ZnFe$_2$O$_4$ (10) | — | 0.371 |
| R. Ex. 4 | MgO (5) | 5 | 0.610 |
| R. Ex. 5 | MgO (10) | — | 0.978 |

*1The value in parentheses shows a thickness (nm).

(Evaluation)

First, based on Referential Examples 4 and 5, it is confirmed that the arithmetic average roughness of the seed layer consisting of MgO increases as the thickness thereof increases. Second, in comparison of Referential Examples 1-4, it is understood that the arithmetic surface roughness of the sample of Referential Examples 1-3 which has the seed layer having the spinel structure (a) or (b), or the inverse spinel structure (c) is about 0.4-0.6 times as large as the arithmetic average roughness Ra of the sample of Referential Example 4 having the MgO seed layer. Taking into account that the thickness of the seed layer in Referential Examples 1-3 is two times as large as the seed layer in Referential Example 4, it is understood that the seed layer having the spinel structure (a) or (b), or the inverse spinel structure (c) exhibits significantly high surface-planarizing effect.

On the basis of the comparison of Referential Examples described above, it is understood that the surface of the magnetic recording layer 30 is also planarized by the surface-planarizing effect of the seed layer having the spinel structure (a) or (b), or the inverse spinel structure (c), in comparison among Examples 1, 2, and 4 and Comparative Example 1 which comprise the magnetic recording layer 30 having an FePt—C (25 vol. %) granular structure. This is also the case in comparison between Example 5 and Comparative Example 2 which comprise the magnetic recording layer 30 having an FePt—C (40 vol. %) granular structure. Besides, it is understood that the planarization of the surface of the magnetic recording layer 30 is achieved by the $MgCr_2O_4$ seed layers having different thickness, based on Examples 1 and 2. Further, it is understood that the surface of the magnetic recording layer 30 is also planarized by the surface-planarizing effect of the seed layer having the spinel structure (a) or (b), or the inverse spinel structure (c), in comparison among Examples 7A, 8A, and 9 and Comparative Examples 3 and 4 which comprise the magnetic recording layer 30 having an FePt non-granular structure.

In comparison among Examples 1-4 and Comparative Example 1 and comparison between Example 6 and Comparative Example 2, the α values of hysteresis loop in the perpendicular direction of Examples 1-4 and 6 which involve the seed layer having the spinel structure (a) or (b), or the inverse spinel structure (c) are more favorable than the values of Comparative Examples 1 and 2. From this result, it is understood that the magnetic recording layers of the magnetic recording media of Examples 1-4 and 6 have a desirable granular structure. The desirable granular structure means a structure in which the magnetic crystal grains are magnetically separated well and no crystal grains derived from the secondary growth is present. It is believed that this result is achieved as follows: the seed layer ($MgCr_2O_4$) having the spinel structure (a) or the seed layer ($Mg_2TiO_4$) having the inverse spinel structure (c) has a small arithmetic average roughness Ra to provide a smooth surface with few abnormal protrusion, and thereby providing the desirable conditions for forming the magnetic recording layer 30.

Further, on the basis of comparisons: (1) among Examples 1 and 2 and Comparative Example 1; (2) between Example 5 and Comparative Example 2; (3) between Example 7A and Comparative Example 3; and (4) between Example 7B and Comparative Example 4, the coercive force in the in-plane direction $Hc_{IP}$ of the magnetic recording media of Examples comprising the $MgCr_2O_4$ seed layer is lower than those of Comparative Examples comprising the MgO seed layer. It is believed that this result is caused by decrease of the in-plane orientation of the c-axis of the FePt magnetic crystal grains, due to the small arithmetic average roughness of the $MgCr_2O_4$ seed layer. On the other hand, on the basis of comparisons: (5) among Examples 3 and 4 and Comparative Example 1; (6) between Example 6 and Comparative Example 2; (7) between Example 8A and Comparative Example 3; and (8) between Example 8B and Comparative Example 4, it is understood that the coercive force in the in-plane direction $Hc_{IP}$ of the magnetic recording media of Examples comprising the $MgTi_2O_4$ seed layer tends to be slightly higher than those of Comparative Examples comprising the MgO seed layer. However, increase in the coercive force in the in-plane direction $Hc_{IP}$ of the magnetic recording media of Examples is not so large as to adversely affect the performance of the magnetic recording media.

The magnetic recording media of Examples 1-4 and 6-9 have a large magnetic anisotropy constant Ku sufficient to make high-density magnetic recording possible. Generally, the thermal stability of the signals recorded in a magnetic recording medium is estimated by an equation of $KuV/k_bT$ (wherein V represents volume of the magnetic crystal grains, $k_b$ represents Boltzmann's constant, and T represents an absolute temperature). It is understood that the value of $KuV/k_bT$ of higher than 60 is generally required for obtaining thermally stable recorded signals. Supposing that the thickness of the magnetic recording layer is 10 nm comparable with current magnetic recording media and the magnetic anisotropy constant Ku is $1.14 \times 10^7$ erg/cm$^3$ (1.14 J/cm$^3$), the relationship of $KuV/k_bT>60$ is maintained even if the particle diameter of the magnetic crystal grains decreases to 5.4 nm. Further, supposing that the recorded signal of one (1) bit is constituted with six magnetic crystal grains, the recording density of 1.2 terabits per square inch can be achieved if the particle diameter is 5 nm. Therefore, it is believed that the values of the magnetic anisotropy constants Ku of the magnetic recording media of Examples 1-4 and 6-9 are capable of achieving a recording density higher than that used in the current magnetic recording.

Further, on the basis of comparison among Examples 7A, 7B, 8A and 9 and Comparative Examples 4 and 4, the magnetic recording media of Examples 7A, 7B, 8A and 9, which comprise the seed layer having the spinel structure (a) or (b), or the inverse spinel structure (c) has the more favorable α values of hysteresis loop in the perpendicular direction than that of the magnetic recording media of Comparative Examples 3 and 4. From this point, it is understood that magnetic properties can be improved by using the seed layer having the spinel structure (a) or (b), or the inverse spinel structure (c), also in the magnetic recording medium comprising the magnetic recording layer of a non-granular structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. All of the patent applications and documents cited herein are incorporated herein by reference in their all entirety.

What is claimed is:

1. A magnetic recording medium comprising a substrate, a seed layer on the substrate, and a magnetic recording layer on the seed layer, wherein the seed layer has a structure selected from the group consisting of:

(a) a spinel structure consisting of Mg, Cr and O;

(b) a spinel structure consisting of Zn, Fe and O; and (c) an inverse spinel structure consisting of Mg, Ti and O, wherein the magnetic recording layer comprises an ordered alloy.

2. The magnetic recording medium according to claim 1, wherein the magnetic recording layer has a granular structure comprising magnetic crystal grains and a non-magnetic crystal grain boundary surrounding the magnetic crystal grain, the magnetic crystal grains comprise said ordered alloy, and the non-magnetic crystal grain boundary comprise a non-magnetic material selected from the group consisting of carbon, an oxide and a nitride.

3. The magnetic recording medium according to claim 1, wherein the seed layer has (a) the spinel structure consisting of $MgCr_2O_4$.

4. The magnetic recording medium according to claim 1, wherein the seed layer has (b) the spinel structure consisting of $ZnFe_2O_4$.

5. The magnetic recording medium according to claim 1, wherein the seed layer has (c) the inverse spinel structure consisting of $TiMg_2O_4$.

6. The magnetic recording medium according to claim 1, further comprising an interlayer formed of a non-magnetic metal or a non-magnetic alloy between the substrate and the seed layer, wherein the seed layer is directly on the interlayer.

7. The magnetic recording medium according to claim 1, wherein the ordered alloy comprises at least one element selected from the group consisting of Fe and Co, and at least one element selected from the group consisting of Pt, Pd, Au and Ir.

* * * * *